United States Patent [19]

Gomoll

[11] 4,449,085

[45] May 15, 1984

[54] CONTROL FOR OPERATION OF A MACHINE TOOL

[75] Inventor: Volker Gomoll, Wernau, Fed. Rep. of Germany

[73] Assignee: Feldmühle Aktiengesellschaft, Düsseldorf, Fed. Rep. of Germany

[21] Appl. No.: 319,615

[22] Filed: Nov. 9, 1981

[30] Foreign Application Priority Data

Nov. 8, 1980 [DE] Fed. Rep. of Germany ....... 3042211

[51] Int. Cl.³ .......................................... G05D 23/00
[52] U.S. Cl. .................................... 318/641; 318/471; 82/DIG. 1; 340/680
[58] Field of Search ............... 318/471, 472, 473, 634, 318/641; 82/DIG. 1; 340/680

[56] References Cited

U.S. PATENT DOCUMENTS

| | | | |
|---|---|---|---|
| 3,646,839 | 3/1972 | Shillam | 318/634 X |
| 4,214,191 | 7/1980 | Watanabe et al. | 318/634 X |
| 4,307,325 | 12/1981 | Saar | 318/472 X |
| 4,318,646 | 3/1982 | Watanabe | 318/473 |

OTHER PUBLICATIONS

Annals of the CIRP, vol. 25, 2.1976, pp. 483–496, "In Process Tool Wear Sensors for Cutting Operations".

*Primary Examiner*—B. Dobeck
*Attorney, Agent, or Firm*—Toren, McGeady and Stanger

[57] ABSTRACT

To control the operation of a machine tool, which has a tool bit cutting a workpiece, the temperature of a measurement spot or area, such as on the cut surface of the workpiece, is checked by an optical element which collects infra-red radiation and focuses it on a thermal sensor. The temperature read by the thermal sensor is registered in an evaluating device which generates a signal when a predetermined temperature condition is reached for discontinuing operation of the machine tool.

8 Claims, 2 Drawing Figures

CONTROL FOR OPERATION OF A MACHINE TOOL

SUMMARY OF THE INVENTION

The present invention is directed to a method of and apparatus for controlling the operation of a tool bit in a machine tool during the processing of workpieces.

In the present invention the term machine tools refers primarily to turning machines, but also includes milling machines, boring mills as well as planing machines to the extent that these machines use a tool bit and, in particular, a replaceable tool bit. Replaceable tool bits are used mostly in the form of so-called turn-over tool bits composed of a plurality of materials in particular hard metals or alloys and ceramic oxide materials. These relatively inexpensive tool bits permit high speed operation and, as a result, economical processing. Obviously, such tool bits wear out and must be replaced. In the use of such tool bits normal wear and tear is not particularly dangerous, however, overloading the tool bit can be dangerous. Such overloading can lead to plastic deformation when hard metals or alloys are used. When the tool bit uses ceramics there is a tendency for the cutting edges of the bit to break off under overloading.

When high speed cutting is used, damage to the tool bit leads to damage to the workpiece. When the workpiece is damaged, in most cases it cannot be used. Furthermore, there is also the likelihood that the support for the tool bit, such as a clamping holder, may be damaged, resulting in maladjustment of the machine setting. Repair of the machine tool necessitates a considerable period where it is out of service, causing a reduction in the number of workpieces produced with a corresponding increase in the cost per workpiece.

It is the primary object of the present invention to provide an arrangement for recognizing the onset of deformation or cracking in the tool bit so that damage to the workpiece and the machine tool including injury to the tool bit holder and maladjustment of the machine setting can be avoided. Moreover, increasing wear on the tool bit should be checked so that possible damage to the workpiece can be avoided.

In accordance with the present invention, the tool bit in a machine tool can be monitored during the processing of workpieces by checking the temperature developed in the area of the cut surface of the workpiece or on the tool bit or of the chips being removed from the workpiece so that the temperature can be supplied to an evaluating device whereby a sudden rise in temperature or a rise above a given upper level of temperature generates the signal for controlling the operation of the tool bit.

Each time a piece of metal is cut from a workpiece, a temperature is developed which heats both the tool bit and the workpiece, and particularly, at the surface from which metal is cut. At the same time, there is a greater rise in temperature in chips or pieces cut from the workpiece.

Though the temperature developed depends on the conditions affecting the cutting operation, the temperature remains practically constant during the cutting operation as long as unforeseen influences do not occur. If, because of an overload, the tool bit begins to crack, the temperature rises abruptly. On the other hand, if the tool bit becomes blunt from continuous wear, the temperature rises gradually. Accordingly, a temperature rise can serve as an indication of wear as well as the signal that the tool bit is in danger of breaking with the resultant damage to the workpiece and the machine tool being imminent. As part of the monitoring operation, the temperature is determined by a thermal sensor connected to an evaluating device so that when a sudden rise in temperature occurs a signal or impulse is generated, however, if there is a slow continuous rise in the temperature another signal is developed when a certain temperature level is exceeded. The signals generated in the evaluating device serve to discontinue operation of the machine tool.

In a preferred manner of operation of the invention, the signal developed when a sudden increase in temperature occurs immediately shuts down the operation of the machine tool.

As mentioned above, a sudden temperature rise is presumably due to the onset of cracks in the tool bit. By immediately shutting operation of the machine tool, the overload on the tool bit is discontinued and the possibility of the tool bit breaking up is avoided. When the possibility of tool bit break-up is prevented, maladjustment of the tool bit holder is avoided and further damage to the holder cannot take place. With the processing of the workpiece stopped, damage to the workpiece is also avoided.

Another advantageous feature of the present invention is that the signal generated as the temperature rises steadily and passes a given level causes the machine tool to shut down following the completion of the processing cycle then in progress. When such a shutdown occurs, a locking action is effected on the operation of the machine tool so that processing of another workpiece cannot be commenced until the locking action is released by the operator.

For reasons not fully explainable, the relation between temperature rise and increased wear is constant. The wear depends to a large degree on the composition of the material being processed with the possibility of varying hardnesses being present though the workpiece has the same chemical composition throughout and has been treated in the same manner. Accordingly, it is not possible to predict with absolute accuracy that one tool bit will process fifty pieces. On the contrary, in practice one must proceed on the premise that the tool bit may be usable for a range of workpieces. Due to this characteristic, the measurement of wear and tear on the tool bit acquires increased importance.

In accordance with the present invention, besides the possibility of a more economical utilization of a tool bit, there is a considerable improvement in the psychological burden on the machine tool operator. Since the operator realizes with certainty that the machine tool and the workpiece will not be destroyed if unforeseeable differences in hardness occur, he is more likely to utilize the full capacity of the machine tool and obtain greater economic production than in the past when he was deterred by the fear of turning out rejected workpieces and periods of shutdown for repairing machine tool damage.

Another important feature of the present invention is the use of visual and/or sound means for shutting down the machine tool. By such means the operator is immediately alerted to machine stoppage and long periods of shutdown are avoided.

A significant feature of the present invention is that the measurement spot or area of an optical element connected to a thermal sensor can be adjusted to check or monitor the cutting edge of the tool bit, the region where chips are removed from the workpiece, or the cut surface of the workpiece which has just been processed by the tool bit. The temperature value ascertained by the thermal sensor in this monitoring operation is fed to an evaluating device which notes when the temperature rise exceeds a given value or where there is a sudden rise in temperature and causes a signal or impulse to be generated. Generally speaking, it is also possible to measure the temperature by direct contact with the heated parts. In the performance of such measurements, a thermostat can be mounted under the tool bit. Similarly, a tracing member arranged on the tool bit holder can scan the cut surface of the workpiece. The possibility of damage in such direct contact is considerable so that complete accuracy of measurement cannot be assured. There is also the possibility of damage when chips are cut from the workpiece, since such chips can be in a wide variety of shapes, particularly long, spiral-shaped chips. Therefore, in accordance with the present invention, temperature measurement is carried out without any direct contact by the use of optical elements which can be made up of concave reflectors as well as lens combinations so that infra-red radiation from the measurement spot or area conducted to a thermal sensor.

In a preferred embodiment of the present invention, infra-red radiation is collected by a condensing lens and is transmitted via a light conductor to the thermal sensor. By providing a light conductor between the optical element and the thermal sensor, it is possible to locate the thermal sensor at any position on the machine tool so that it is positioned for improved accessibility as well as better protection. The most intense heating action occurs at the cutting edge of the tool bit and on the chip or piece of material cut from the workpiece. In addition, a rise in temperature can also be determined at the surface of the workpiece which has just been worked on by the tool bit, though a lower temperature exists at this location. It is not always possible to check with complete accuracy the temperature of a very fast-moving chip cut from the workpiece. Accordingly, the measurement spot or area of the optical element is advantageously located on that portion of the surface of the workpiece which has just been processed by the tool bit. The measurement spot or area is to be understood as the surface checked by the optical element, that is, the area from which infra-red radiation is collected by the optical element. Generally, it is sufficient if the measurement spot covers an area of less than 50 mm$^2$, because even though only a small part of this spot is located on the surface of the workpiece just processed by the tool bit, a well-defined signal can be obtained. Nevertheless, the measurement spot should not be made unnecessarily small. The lower limit for the measurement spot is advantageously about 1 mm$^2$, since a very high adjustment precision is needed for the measurement spot which should be located immediately adjacent to the cutting edge of the tool bit.

At the high cutting speeds which can be used when ceramic oxide turn-over tool bits are used, it is possible, such as in a turning operation, to adjust the measurement spot to any desired area of the circular surface of the workpiece being processed. Advantageously, the measurement spot is adjusted so that it is not more than 30° to 60° distant from the point at which the cutting edge of the tool bit contacts the workpiece. Preferably, the measurement spot is located less than 30° from the cutting edge, since it is then possible to assure that the measuring operation is not obstructed by flying chips which have a higher temperature.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
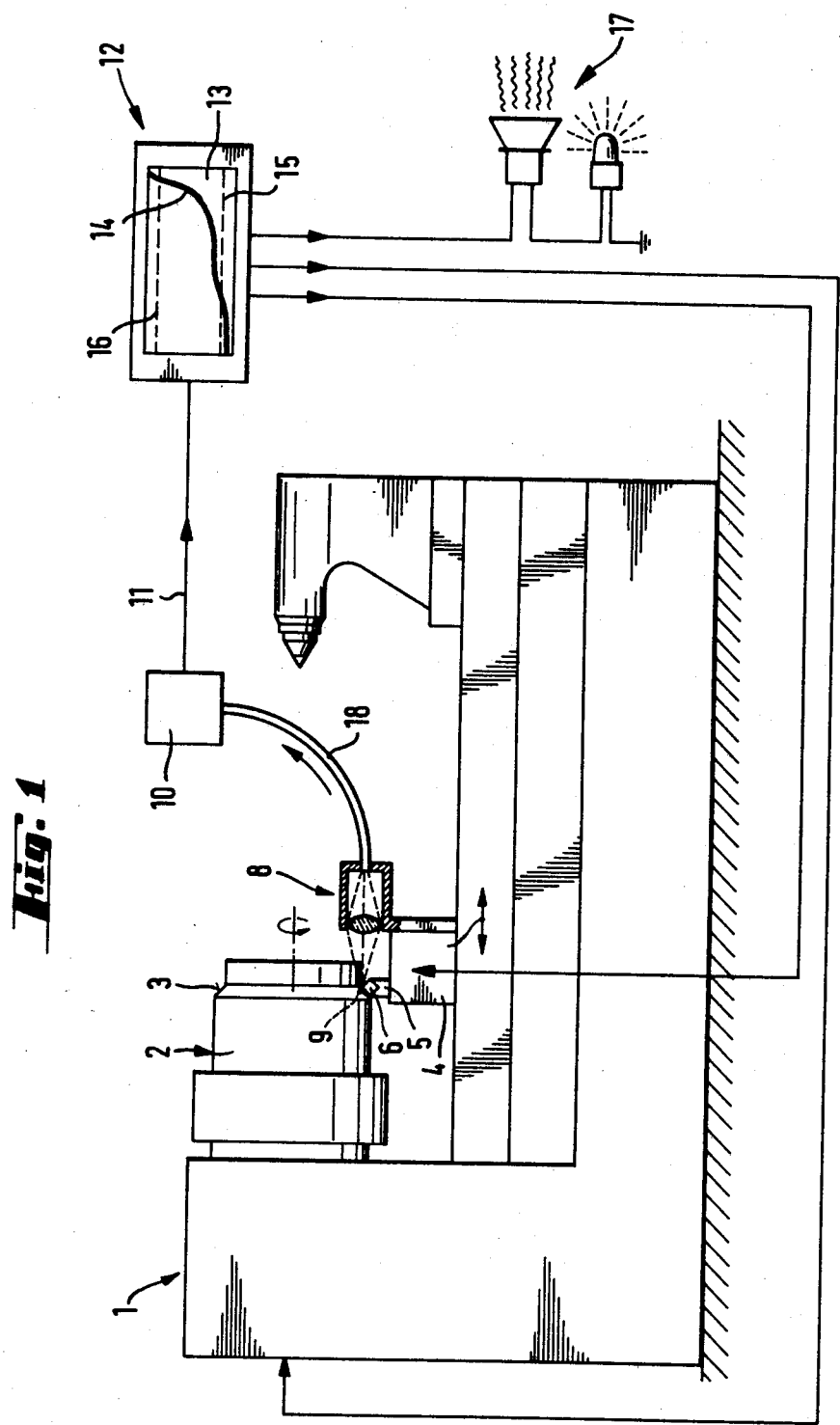
FIG. 1 is a diagrammatic side view of a drilling machine with a tool life sensor.
Figure 2:
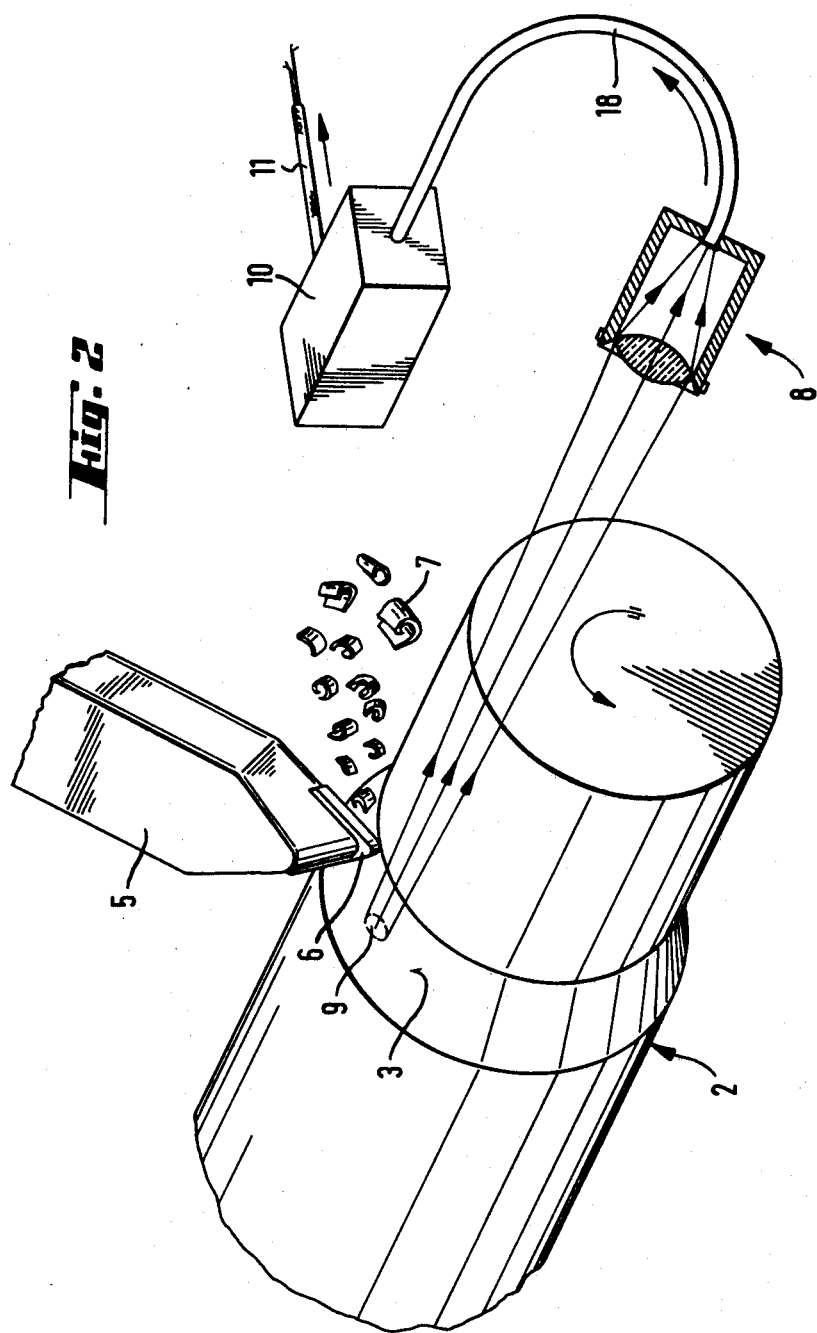
FIG. 2 is an enlarged partial view of the arrangement shown in FIG. 1.

In FIG. 1 a turning machine 1 is shown into which a workpiece 2 has been clamped. The workpiece has a stepped surface 3 produced in the turning process. A support 4 holds a turning tool 5 in which a turn-over tool bit 6 is mounted in a recess. As shown by the arrow, workpiece 2 rotates counterclockwise and the tool bit 6 trims the surface of the workpiece 2 so that chips 7 are displaced from the workpiece in the form of chip curls, note FIG. 2. Spaced outwardly, in the axial direction of the workpiece 2, from its surface 3 is an optical element 8 in the form of a condensing lens for collecting infra-red radiation from the measurement spot or area 9 on the stepped surface 3 of the workpiece. The optical element 8 moves relative to the workpiece, since it is mounted on the support 4. The measurement spot 9 is located on that part of the stepped surface 3 which has just been trimmed or cut by the tool bit 6. A light conduit 18 is connected between the optical element 8 and a thermal sensor 10 which senses temperatures above 50° C. The light conduit 18 is a flexible member.

Thermal sensor 10 is connected via a line 11 with an evaluation device 12. Evaluation device 12 includes a recording apparatus 13 on which the path of the temperature curve 14 is traced. The recording apparatus 13 has a line 15 denoting the average temperature of the curve 14 and a line 16 defining a maximum temperature. When the temperature collected by the optical element 8 and read by the thermal sensor 10 exceeds the maximum temperature of the line 16, an impulse or signal is released by the device 12 for shutting down the operation of the turning machine after the completion of its current processing cycle. In addition, a signal or impulse is generated by the device 12 when a sudden rise in the temperature occurs and this signal effects a sudden shutdown of the turning machine 1. In either case, when the device 12 emits the signal or impulse, a visual and/or sound alarm apparatus is activated to alert the operator to the condition of the turning machine.

While specific embodiments of the invention have been shown and described in detail to illustrate the application of the inventive principles, it will be understood that the invention may be embodied otherwise without departing from such principles.

I claim:

1. Method of monitoring the tool bit in a machine tool during the processing of a workpiece comprising the steps of measuring the temperature of the processed surface of the workpiece, feeding the measured temperature to an evaluation device, checking the measured temperature and terminating the processing operation on the occurence of one of a sudden increase in the measured temperature and a rise of the measured temperature above a given level, measuring the temperature by arranging an optical element with a measurement spot directed at the surface to be measured, collecting the infra-red radiation from the measurement spot and transferring the radiation to a thermal sensor, reading the temperature indicated by the infra-red radiation in the thermal sensor and passing the temperature on to an evaluating device and determining in the evaluating device when there is a sudden temperature increase or the rise in the measured temperature is above a given level.

2. Method, as set forth in claim 1, including the step of immediately shutting down the operation of the machine tool when a sudden temperature increase is checked.

3. Method, as set forth in claim 1, including the step of shutting down the machine tool after the completion of its processing cycle when the temperature being checked exceeds the given level.

4. Method, as set forth in claim 3, including the step of applying a locking action on the machine tool when the checked temperature rises above the given level requiring the release of the locking action before the processing of a new workpiece can be commenced.

5. Method, as set forth in claim 1, including the step of emitting at least one of a visual or sound signal when the checked measured temperature rises above the given level or experiences a sudden rise causing the termination of the processing operation.

6. Apparatus for monitoring the operation of a machine tool having a tool bit for cutting the surface of a workpiece, comprising a lens mounted to collect infra-red radiation from a measurement spot, a thermal sensor, means for conveying the infra-red radiation from said lens to said thermal sensor, an evaluation means connected to said thermal sensor for registering the temperature of the measurement spot and for providing a signal when a predetermined temperature condition has been reached for discontinuing the operation of the machine tool.

7. Apparatus, as set forth in claim 6, including means connected to said evaluation means for issuing at least one of a visual or sound signal when the predetermined temperature condition has been reached.

8. Apparatus, as set forth in claim 6, wherein said means for conveying the infra-red radiation from said lens to said sensor comprises a flexible light conduit for selectively locating said thermal sensor relative to said lens.

* * * * *